Patented Nov. 26, 1940

2,222,740

UNITED STATES PATENT OFFICE 2,222,740

PRODUCTION OF SULPHUR DIOXIDE FROM CALCIUM SULPHATE

Ferdinand Bornemann, Hans Huber, and Hans Mengele, Wiesbaden-Biebrich, Amoneburg, Germany, assignors to Chemische Werke, vorm. H. & E. Albert, Wiesbaden-Biebrich, Germany No Drawing. Application April 14, 1938, Serial No. 202,132. In Germany April 15, 1937

3 Claims. (Cl. 23—177)

This invention relates to the production of sulphur dioxide from calcium sulphate.

The production of $SO_2$ from calcium sulphate is known to be technically impossible by simple thermal decomposition of the calcium sulphate. The decomposition pressure of calcium sulphate is sufficiently great for the reaction to be technically utilisable only towards 1500°. The use of such high temperatures and the low reaction velocity therefore make the production of $SO_2$ by thermal decomposition appear uneconomical.

Attempts have therefore already been made to accelerate the formation of $SO_2$ from calcium sulphate by the addition of carbon, and to perform the reaction at a low temperature. However, it was not possible to make technical use of this method of producing $SO_2$ until a way was found of driving off the $SO_2$ practically completely and of obtaining the calcined residue in the form of a cement, by adding materials containing ferric oxide, aluminum oxide and $SiO_2$ and such amounts of carbon as are insufficient for the reduction of calcium sulphate to calcium sulphide. In carrying out the process a very long time is required for heating the crude power gradually up to sintering temperatures of between 1300 and 1400°. Nevertheless, premature melting easily occurs, so that the driving off of $SO_2$, for example in a rotary kiln, involves great technical difficulties.

According to the present invention the decomposition of calcium sulphate to produce sulphur dioxide is carried out in the presence of materials containing ferric oxide, aluminium oxide and $SiO_2$, and of carbon, together with phosphates, the weight of phosphate to be employed being equal to, at most, three quarters of the amount of calcium sulphate.

The present process has the following advantages:

1. The decomposition of the calcium sulphate to $SO_2$ is accelerated.
2. It can be carried out at low temperatures.
3. The mixture is made more refractory and thus the danger of melting—which is much feared in the decomposition of calcium sulphate—is substantially lessened.
4. In addition to $SO_2$, a residue is produced comprising a valuable fertiliser which contains $P_2O_5$ in available form.

The addition of crude phosphate can be carried out in various ways in accordance with the present invention.

I

According to one embodiment of the present process an excess of calcium sulphate is caused to react with iron-aluminium phosphate and silica, if desired in the presence of additions of carbon. 1 part by weight of $P_2O_5$ in the iron-aluminium phosphate requires about 4½–5 parts of $CaSO_4$, and, furthermore, at least an equal amount of $CaSO_4$ referred to ferric oxide + aluminium oxide + $SiO_2$, in order to produce without difficulty by heating, in addition to $SO_2$, a phosphate fertilizer. Up to 9 parts by weight of $CaSO_4$ may be added to one part by weight of $P_2O_5$ in the iron-aluminium phosphate, in order to produce, in conjunction with $SiO_2$ and carbon, a fertiliser containing at least 14% of $P_2O_5$, the $P_2O_5$ of which is almost completely soluble in 2% citric acid, and highly soluble in ammoniacal ammonium citrate solution according to Petermann. The addition of $SiO_2$ is in most cases approximately equal to the proportion of $P_2O_5$ but may, however, also be higher or lower. If the heating step be carried out in a rotary kiln, the exhaust gases contain up to 7% of $SO_2$.

For example, 100 parts of an aluminium phosphate of the composition:

| | Per cent |
|---|---|
| $P_2O_5$ | 31.5 |
| $Al_2O_3$ | 21.1 |
| $Fe_2O_3$ | 1.6 |
| Insoluble matter (quartz) | 28.0 | are calcined at about 1300° in the rotary kiln, in a weakly oxidising atmosphere, with

| | Parts |
|---|---|
| Anhydrite | 175 |
| Sand | 12 |
| Coke | 14 |

The exhaust gases contain over 3.0% of $SO_2$ and are treated to yield sulphuric acid. The calcined residue contains:

| | Per cent |
|---|---|
| Total $P_2O_5$ | 18.9 |
| CaO | 43.3 |
| $SiO_2$ | 23.9 |
| $Al_2O_3$ + $Fe_2O_3$ | 13.9 |

18.5% of $P_2O_5$ is soluble in citric acid, 16.6% in ammonium citrate (corresponding to a relative citric acid solubility of 97.75% and a relative ammonium citrate solubility of 88.7%).

In another example, 100 parts of the same aluminium phosphate are heated, together with

| | Parts |
|---|---|
| Anhydrite | 315 |
| Sand | 13 |
| Coke | 24 | in a finely ground state to 1000–1400° in a rotary kiln with a slightly oxidising oil flame. The outgoing gases contain 6–7 of $SO_2$ and are treated in known manner to yield sulphuric acid. The calcined material contains:

| | Per cent |
|---|---|
| Total $P_2O_5$ | 13.95 |
| CaO | 57.70 |
| $SiO_2$ | 18.15 |
| $Al_2O_3+Fe_2O_3$ | 10.20 |

13.82% of $P_2O_5$ are soluble in 2% citric acid (=99.0% relative citric acid solubility).

12.54% of $P_2O_5$ are soluble in ammonium citrate according to Petermann (=90.0% relative ammonium citrate solubility).

II

A further embodiment consists of heating calcium sulphate with $SiO_2$, carbon and calcium phosphate, if desired in the presence of materials containing ferric oxide and aluminium oxide. The amount of $P_2O_5$ to be added, in the calcium phosphate, to the mixture of calcium sulphate and $SiO_2$, is apparent from the following examples:

1

| | Parts |
|---|---|
| Anhydrite | 160 |
| Curaçao phosphate (39.0% $P_2O_5$) | 100 |
| Sand | 45 |
| Carbon | 12 | are heated, intimately mixed, to about 1400°. The effluent gases contain approximately 2–3% of $SO_2$.

The ignited residue contains:

| | Per cent |
|---|---|
| Total $P_2O_5$ (18.7% soluble in citric acid, 16.9% soluble in citrate) | 19.0 |
| CaO | 57.1 |
| $SiO_2$ | 22.15 |

The relative citric acid solubility amounts to 98.4%. The relative ammonium citrate solubility amounts to 88.8%.

2

| | Parts |
|---|---|
| Anhydrite | 275 |
| Curaçao phosphate (39% $P_2O_5$) | 100 |
| Sand | 71 |
| Coke | 22 | intimately mixed, are heated in the rotary kiln to, at most, sintering temperature. The exhaust gases contain 3–5% of $So_2$. The heated residue contains:

| | Per cent |
|---|---|
| Total $P_2O_5$ (13.6% citric acid soluble, 12.75% citrate soluble) | 14.0 |
| CaO | 59.2 |
| $SiO_2$ | 25.7 |

The relative citric acid solubility is 97.1%, and the relative ammonium citrate solubility 91.0%.

The amount of calcium sulphate to be employed amounts in the examples to from 4 to 7 parts by weight to one part of $P_2O_5$, while the amount of the simultaneous addition of $SiO_2$ is at least approximately as great as the $P_2O_5$ addition and (approximately proportionally to the increase of calcium sulphate) rises to about twice as much as the $P_2O_5$ proportion. The content of about 14% of $P_2O_5$ in the heated phosphate, however, does not represent the lowest limit of the crude phosphate addition. Even such amounts of $P_2O_5$ as amount to only about 5–14% of the resulting heated phosphate, exhibit the advantageous action of the present invention and naturally make themselves particularly noticeable in the increased $SO_2$ concentration of the exhaust gases. The $SiO_2$ proportion then naturally amounts to from 3 to 6 times as much as the $P_2O_5$ addition in the crude phosphate. These additions may also be made in the form of aluminium silicate (clay and the like), so that the $P_2O_5$ content is further lowered by the additional amount of aluminium oxide. For example, an originating mixture (crude powder) consisting of

| | Parts |
|---|---|
| Curaçao phosphate containing 39% of $P_2O_5$ | 100 |
| Anhydrite | 200 |
| Clay with 65.5% of $SiO_2$ | 80 |
| Coke | 16 | is heated to 1300–1400° in the rotary kiln. The concentration of $SO_2$ in the exhaust gases amounts to over 3%. The heated residue contains

| | Per cent |
|---|---|
| $P_2O_5$ | 15.1 |
| $SiO_2$ | 20.8 |
| CaO | 52.3 |
| $Al_2O_3$ | 7.7 |
| $Fe_2O_3$ | 3.9 |

The $P_2O_5$ content is soluble in citric acid to the extent of 94.6%. In quite a general way, therefore, the process is accomplished by adding crude phosphate to a mixture of calcium sulphate and materials containing ferric oxide, aluminium oxide and $SiO_2$, in which mixture the amount of calcium oxide (CaO) is, at most, in the proportion of about 1.8:1 relatively to the total amount of the acid constituents ($SiO_2+Fe_2O_3+Al_2O_3$).

III

In order to increase the sulphur dioxide in the outgoing gases, various methods may be adopted.

(a) It has been ascertained that the expulsion of the sulphuric acid from an originating mixture containing a high proportion of crude phosphate is generally accomplished more quickly than the conversion of the heated residue into available phosphate fertilizer. It is true that it is possible to extend the process of igniting the charge material until the phosphoric acid in the residue (containing no $SO_3$) becomes completely available possibly also with the aid of already known measures, which have previously been employed for the disintegration of crude phosphates, for example with the aid of steam or by heating in counter-current, and so on. In this way, however, the $So_2$ concentration in the exhaust gases was lowered to such an extent that it is no longer adequate for the production of sulphuric acid. It is therefore convenient to split up the heating process into two stages:

(1) Into one stage for the decomposition of the calcium sulphate with calcium phosphate, silica, coal, and so on, when the sulphur dioxide is released in a high concentration and passes on for the manufacture of sulphuric acid the resulting residue containing $P_2O_5$ which exhibits only a relatively low availableness.

(2) Into a second stage of the heating process, in which the $P_2O_5$ of the residue is converted into a citric acid soluble and ammonium citrate soluble (available) form.

A particularly advantageous apparatus for carrying out the first stage of the heating process has been found to be a sintering apparatus which works on the suction draught method, and permits the production of exhaust gases high in $SO_2$. The known rotary kiln has proved to be a favourable apparatus for carrying out the second part of the heating process and producing the phosphate fertiliser. As a portion of the charge material, already once ignited and low in $SO_3$, is preferably supplied once again to the traveling grate of the sintering apparatus, together with the originating mixture (crude powder), whereby the percentage of available phosphoric acid contained therein also already increases, short heating times only are required in the second stage of the heating process, in order to produce (for example in the rotary kiln) a high grade phosphate fertiliser. Both the heating in the first and second stages and the returning of the already heated material to the originating mixture (crude powder) can naturally also be successfully carried out in any other furnace.

*Example*

An originating mixture (crude powder) of

| | Parts |
|---|---|
| Cola apatite (39% $P_2O_5$) | 100 |
| $CaSO_4$ (dehydrated with 15% of $SiO_2$ + clay) | 250 |
| Sand | 25 |
| Coke | 17 | is finely ground and mixed. On heating in the rotary kiln to 1300–1400°, an exhaust gas containing about 4% of $SO_2$ is produced. The heated phosphate itself which is scarcely sintered, and the $P_2O_5$ content of which is only half soluble in citric acid, falls into a rotary kiln disposed thereunder and is there further heated in countercurrent, with the introduction of steam. After the second stage of the heating process, the finished product has a total content of 16.5% of $P_2O_5$ and a citric acid soluble $P_2O_5$ content of 15.96%. The relative citric acid solubility thus amounts to 96.3%.

An originating mixture (crude powder) of

| | Parts |
|---|---|
| Pebble phosphate (35.4% $P_2O_5$) | 100 |
| Anhydrite | 215 |
| Sand | 50 |
| Coke | 17 | is finely ground and mixed.

| | Parts |
|---|---|
| Material returned from the previous decomposition | 250 |
| and Coke | 33 | are coarsely ground and mixed with the originating mixture (crude powder). The damped mixture is ignited on a Dwight Lloyd travelling grate. The exhaust gases produced by the suction draught method contain 3–5% of $SO_2$ and are passed on to the manufacture of sulphuric acid. The sintered product contains 15.3% of total $P_2O_5$, of which only half is soluble in citric acid, and is used partly as return material for the originating mixture (crude powder), and part of it drops from the travelling grate direct into a rotary kiln, in which it undergoes further heating and the whole $P_2O_5$ content is thereby converted into the citric acid soluble form.

IIIb

If, however, it is desired to avoid working in two stages, and nevertheless, while attaining a high concentration of $SO_2$ in the exhaust gases, to obtain a high relative citric acid solubility on the part of the $P_2O_5$ in the heated product, in one operation simultaneously with the expulsion of the $SO_2$, even when employing crude phosphates of apatite structure which are difficult to decompose, it is necessary to keep the addition of crude phosphate to the mixture of calcium sulphate, $SiO_2$, materials containing ferric oxide and aluminium oxide, and carbon, so low that less than 14% of $P_2O_5$ is contained in the ignited product.

*Examples*

An originating mixture (crude powder), of

| | Parts |
|---|---|
| Pebble phophate containing 35.4% of $P_2O_5$ and 6.5% of $SiO_2$ | 100 |
| Anhydrite | 450 |
| Sand | 100 |
| Coke | 35 | are mixed in a finely ground state, and heated to 1300–1400° in the rotary kiln, thus producing a moderately sintered product containing 9.4% of $P_2O_5$ and a citric acid soluble $P_2O_5$ content of 8.5%, the relative citric acid solubility thus amounting to 90.3%. The exhaust gases contain about 5% of $SO_2$ in this case.

An originating mixture (crude powder) of

| | Parts |
|---|---|
| Pebble phosphate containing 32.3% of $P_2O_5$ and 9.8% of $SiO_2$ | 100 |
| Anhydrite | 700 |
| Sand | 160 |
| Coke | 54 | is mixed in a finely ground state and heated to 1300–1400° in the rotary kiln, thus producing a heated product having a total content of 6.03% of $P_2O_5$ and a citric acid soluble $P_2O_5$ content of 5.99%. The relative citric acid solubility is thus almost 100%. The concentration of $SO_2$ in the exhaust gases attains almost 7%.

As is apparent from the examples, the amount of calcium sulphate to be employed (for a $P_2O_5$ content of less than 14% of $P_2O_5$ in the heated product) amounts to more than seven times as much as the content of $P_2O_5$, and may be raised to as much as 25 times the amount of $P_2O_5$ in the case of 5–6% of $P_2O_5$ in the heated phosphate. These heated products may be used as low grade fertilisers or, in order to obtain higher grade fertilisers, may be mixed with heated phosphates having a high $P_2O_5$ content, for example with a heated phosphate obtained in accordance with example II, 1, or with an α-tricalcium phosphate obtained by calcining superphosphate, or with a high grade Thomas powder. The low grade heated phosphates may, however, also advantageously be mixed with crude phosphate and silica, and high grade fertilisers be produced by igniting these mixtures, but without the production of $SO_2$.

IV

A further embodiment aiming at producing an exhaust gas high in $SO_2$, together with a high grade phosphate fertiliser as the residue of a single heating process, comprises adding, to the mixture of calcium sulphate, carbon, silica and so forth, a calcium phosphate that is entirely or partly decomposed by sulphuric acid to form monocalcium phosphate (superphosphate). By this embodiment of the process, not only is the $SO_2$ extracted from the calcium sulphate, but the $SO_2$ is also extracted from the sulphuric acid employed to decompose the crude phosphate.

For example an originating mixture (crude powder) consisting of:

| | Parts |
|---|---|
| Pebble phosphate containing 35.4% of $P_2O_5$, and decomposed with 110 parts of sulphuric acid (53.9° Bé.) to form superphosphate | 100 |
| Anhydrite | 150 |
| Sand | 35 |
| Coke | 21 | is mixed in a dry and finely ground state and heated to about 1400° in the rotary kiln. The exhaust gases contain 7% of $SO_2$. The heated product contains 19.1% of total $P_2O_5$, 18.9% of citric acid soluble $P_2O_5$ (99.0%), and 17.6% ammonium citrate soluble $P_2O_5$ (92.1%).

Alternatively, an originating mixture (crude powder), consisting of:

| | Parts |
|---|---|
| Pebble phosphate containing 32.3% of $P_2O_5$, and partly decomposed with 35 parts of sulphuric acid (53.9° Bé.) to form monocalcium phosphate | 100 |
| Anhydrite | 190 |
| Quartz sand | 41 |
| Coke | 18 | is mixed in a dry, finely ground state, and heated to 1400° in the rotary kiln. The exhaust gases contain about 6% of $O_2$. The heated product contains 15.15% of total $P_2O_5$, 15.09% of citric acid soluble $P_2O_5$ (99.6% relative citric acid solubility) and 13.62% of ammonium citrate soluble $P_2O_5$ (=90% relative ammonium citrate solubility).

V

A further embodiment aiming at producing an exhaust gas high in $SO_2$, together with a high grade phosphate fertiliser as the residue of a single heating process, comprises adding to the mixture of calciumsulphate, carbon, silica and so forth, not a natural but an artificial manufactured phosphate. Fit for this purpose are f. i. a crude phosphate, which has been transformed with or without adding silica by a preceding heating process at a temperature of 1300°–1400° C. in tricalciumphosphate, but without that its whole $P_2O_5$-content has an available form. Just as fit is a tricalciumphosphate, which has been built by heating superphosphate, or the slag won by the Thomas-Process, or calcium-metaphosphate. These and similar phosphates manufactured in an artificial way, contain already the $P_2O_5$ in a partly available form and are particularly easy and quick transformed by heating according to the present invention mixed with calciumsulphate coal, silica, clay and so on in a high grade phosphate with nearly perfect available $P_2O_5$, whilst the $SO_2$ content of the exhaust gases is really high.

For example an originating mixture (crude powder) consisting of:

| | Parts |
|---|---|
| Tricalciumphosphate, manufactured by the heating pebble phosphate (containing 32.3% $P_2O_5$ and 9.1% insoluble matter) | 100 |
| Anhydrite | 210 |
| Sand | 45 |
| Coke | 16 | is mixed in a dry and finely ground state and heated to about 1400° in a rotary kiln. The exhaust gases contain 5% of $SO_2$. The heated product contains 15.15% of total $P_2O_5$, and 15.15% of citric acid soluble $P_2O_5$ (corresponding to a relative citric acid solubility of 100%) and 13.9% of ammonium citrate soluble $P_2O_5$ (corresponding to a relative ammoniumcitrate solubility of 92.2%).

In another example, an originating mixture (crude powder) consisting of:

| | Parts |
|---|---|
| Calciummetaphosphate (containing 70% of $P_2O_5$ and 5% silica) | 100 |
| Anhydrite | 600 |
| Sand | 85 |
| Coke | 48 | is mixed in a dry, finely ground state, and heated to 1400° in the rotary kiln. The exhaust gases contain about 7% of $SO_2$. The heated residue contains 16.1% of total $P_2O_5$ and 16.1% of citric soluble $P_2O_5$ (corresponding to a relative citric acid solubility of 100%) and 15.2% of ammonium citrate soluble $P_2O_5$ (corresponding to an ammonium citrate solubility of 94.4%).

VI

The gypsum mud produced as a waste product in the manufacture of phosphoric acid from calciumphosphate and sulphuric acid, is generally speaking, particularly suitable for the conversions described. This product contains up to about 3% and more of $P_2O_5$, mostly in undecomposed form, referred to the dry substance. If such gypsum be decomposed in accordance with the present invention, with or without a further addition of crude phosphate, for the purpose of extracting the sulphuric acid from the gypsum the valueless phosphoric acid in the waste gypsum is also rendered useful. In this manner these factories which make double superphosphate and other phosphate fertilizer salts from calcium phosphate and sulphuric acid, are also enabled to recycle the sulphuric acid needed for the manufacture of their phosphoric acid, so that practically no sulphuric acid is wasted.

For example, a waste gypsum mud from a phosphoric acid plant, in which pebble phosphate (32.3% $P_2O_5$ and 9.1% $SiO_2$) is decomposed with sulphuric acid, is dried. The content of $P_2O_5$ amounts to 3.25%, the content of undecomposed crude phosphate 6.0%. An originating mixture (crude powder) consisting of:

| | Parts |
|---|---|
| Dried gypsum containing $P_2O_5$ | 100 |
| Clay slate containing 65.5% of $SiO_2$ | 15 |
| Coke | 6.5 | is heated to about 1300–1400°, in a finely ground state, the resulting exhaust gases containing about 6–7% of $SO_2$. The heated residue contains 5.0% of $P_2O_5$ in available form and can be furnished with a higher content of available phosphoric acid after mixing with a high grade Thomas slag powder. However, the heating of this residue with fresh amounts of crude phosphate, if desired also with $SiO_2$, also supplies high grade phosphate fertiliser in an advantageous manner, this time without the production of $SO_2$.

Alternatively, an originating mixture, consisting of:

| | parts |
|---|---|
| Same dehydrated waste gypsum mud | 100 |
| Curaçao phosphate containing 39% of $P_2O_5$ | 55 |
| Clay containing 76% of $SiO_2$ | 21 |
| Coke | 6.5 | is heated to about 1400° in a finely ground state, the $SO_2$ concentration of the exhaust gases of the rotary kiln then amounting to over 3%. The heated residue contains 19.9% of total $P_2O_5$ and 19.0% of citric acid soluble $P_2O_5$ (corresponding to a relative citric acid solubility of 95.4%) and 17.5% of ammonium citrate soluble $P_2O_5$ (corresponding to a relative ammonium citrate solubility of 88%).

The process according to the present invention has nothing to do with processes already described in literature. Some processes are known, in accordance with which crude phosphate is partly decomposed with sulphuric acid and then ignited, the phosphoric acid being thus intended also to become soil-soluble. The present process differs from these processes in many respects:

1. According to known processes, no $CaSO_4$ is added to the crude phosphate, but is merely formed exclusively by the addition of sulphuric acid to the calcium phosphate. Thus, according to known processes, no sulphuric acid is extracted, but sulphuric acid is consumed.

2. The $SO_2$ concentration in the exhaust gases is so small, in known processes, that it is not suitable for the manufacture of sulphuric acid, whereas, in accordance with the present invention, the $SO_2$ concentration can be raised up to 7%.

3. In accordance with known processes, no $SiO_2$ is added, while the $SiO_2$ addition is an essential feature of the present invention.

4. The formation of an heating residue with available phosphoric acid proceeds far more slowly, in known processes, than in accordance with the present invention.

Small amounts of calcium sulphate, in amounts of up to 80%, have also already been added to the crude phosphate mixture with silica, and so on. To sum up, it may be said that, in accordance with known processes, quite different products are obtained than in accordance with the present invention.

By the addition of calcium, iron and aluminium phosphates to a mixture of gypsum or calcium sulphate with $SiO_2$ and, if desired, materials containing $Fe_2O_3$ and $Al_2O_3$ and carbon, and the heat treatment of this originating mixture, it is thus possible, in accordance with the present invention, to produce $SO_2$ in such a concentration in the exhaust gases, that it can easily be treated to produce sulphuric acid, and at the same time to produce heated phosphate containing available phosphoric acid.

Having now particularly described and ascertained the nature of our said invention and in what manner the same is to be performed, we declare that what we claim is:

1. The process of producing $SO_2$ and phosphate fertilizer which comprises: mixing crude calcium phosphate with calcium sulphate obtained as a waste product in the technical production of phosphoric acid from calcium phosphate and sulphuric acid, silicic acid and carbon in such proportion that one part of $P_2O_5$ (in the rock phosphate) by weight is used for every 4 to 25 parts of $CaSO_4$ and for every 1 to 6 parts of silicic acid ($SiO_2$); heating this mixture to a temperature not less than 1200° and not more than sintering temperature; recovering the $SO_2$ from the gases and utilizing the residue as fertilizer.

2. The process of claim 1 in which the heating is carried out in two steps, first to between 1300° and 1400° C. with recovery of $SO_2$ and a second step at a higher temperature without recovery of $SO_2$ whereby the residue is converted to fertilizer.

3. The process of claim 1 in which a part of the incandescent residue is utilized as a crude phosphate in a second cycle.

FERDINAND BORNEMANN.
HANS HUBER.
HANS MENGELE.